US011079916B2

(12) United States Patent
Francioso

(10) Patent No.: US 11,079,916 B2
(45) Date of Patent: Aug. 3, 2021

(54) MULTIPLE SOURCE MEDIA MANAGEMENT

(71) Applicant: Microsoft Technology Licensing, LLC, Redmond, WA (US)

(72) Inventor: Roberto Stewart Francioso, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 83 days.

(21) Appl. No.: 16/247,472

(22) Filed: Jan. 14, 2019

(65) Prior Publication Data
US 2020/0225837 A1    Jul. 16, 2020

(51) Int. Cl.
  *G06F 3/0484* (2013.01)
  *G06F 9/451* (2018.01)
  *G06F 3/16* (2006.01)

(52) U.S. Cl.
  CPC .......... *G06F 3/04847* (2013.01); *G06F 3/165* (2013.01); *G06F 9/451* (2018.02)

(58) Field of Classification Search
  CPC .... G06F 3/165; G06F 3/04847; G06F 3/0484; G06F 9/451; H04N 21/47217; H04N 21/4312; H04N 21/4431
  See application file for complete search history.

(56) References Cited

U.S. PATENT DOCUMENTS

| | | | | |
|---|---|---|---|---|
| 9,275,673 | B2* | 3/2016 | Elliott | G06F 3/0484 |
| 2007/0244586 | A1* | 10/2007 | Champion | G06F 3/165 |
| | | | | 700/94 |
| 2008/0189355 | A1* | 8/2008 | Mahajan | H04L 67/125 |
| | | | | 709/203 |
| 2009/0177967 | A1* | 7/2009 | Moore | G06F 16/639 |
| | | | | 715/716 |
| 2014/0068440 | A1 | 3/2014 | Wiltzius et al. | |
| 2018/0113579 | A1 | 4/2018 | Johnston et al. | |

OTHER PUBLICATIONS

Jeremy, "How to Change the Sound Settings on Ubuntu 13.04", (Sep. 2013), <URL: http://thelinuxstartup.com/2013/09/26/how-to-change-the-sound-settings-on-ubuntu-13-04/>, p. 1-3 (Year: 2013).*
Freedesktop, "Media Player Remote Interfacing Specification", (Sep. 18, 2013), <URL: https://www.freedesktop.org/wiki/Specifications/mpris-spec/>, p. 1-2 (Year: 2013).*

(Continued)

*Primary Examiner* — Mong-Shune Chung
(74) *Attorney, Agent, or Firm* — Schwegman Lundberg & Woessner, P.A.

(57) ABSTRACT

A computing device identifies a plurality of media applications configured to operate at the computing device. The computing device accesses metadata and playback information for each media application of the plurality of media applications. The computing device generates a unified graphical user interface for the plurality of media applications. The unified graphical user interface provides media information and control access for each corresponding media application.

16 Claims, 10 Drawing Sheets

(56) References Cited

OTHER PUBLICATIONS

Logix, "Add YouTube Player Controls To Your Linux Desktop With browser-mpris2 (Chrome Extension)", (Aug. 22, 2018), <URL: https://www.linuxuprising.com/2018/08/add-youtube-player-controls-to-your.html/>, p. 1-5 (Year: 2018).*
MPT, "Sound", (Mar. 30, 2017), <URL: https://wiki.ubuntu.com/Sound/>, p. 1-24 (Year: 2017).*
Protalinski, "YouTube ditches Flash for HTML5 video by default", (Jan. 27, 2015), <URL: https://venturebeat.com/2015/01/27/youtube-ditches-flash-for-html5-video-by-default/>, p. 1-4 (Year: 2015).*
Wikipedia, "Banshee (media player)", (Sep. 17, 2018), <URL: https://en.wikipedia.org/wiki/Banshee_(media_player)/>, p. 1-7 (Year : 2018).*
Ask Ubuntu, "Is it possible to control app volume from taskbar?", (May 27, 2016), <URL: https://askubuntu.com/questions/770522/is-it-possible-to-control-app-volume-from-taskbar/>, p. 1-3 (Year: 2016).*
"International Search Report and Written Opinion Issued in PCT Application No. PCT/US20/012280", dated Mar. 31, 2020, 13 Pages.

* cited by examiner

MULTIPLE SOURCE MEDIA MANAGEMENT

TECHNICAL FIELD

The subject matter disclosed herein generally relates to a special-purpose machine that manages multiple source media from different applications, including computerized variants of such special-purpose machines and improvements to such variants. Specifically, the present disclosure addresses systems and methods for providing metadata and control access corresponding to each media application in a consolidated user interface.

BACKGROUND

A computing device can play media (audio/video) using different kinds of media applications residing on the computing device. For example, the computing device can include a default media player that can play MP3 files. A web browser operating on the computing device can also stream music from a remote server. Each media application includes its own media control user interface. The user of the computing device has to navigate to each media application to identify which song is being played and to control the media application (e.g., skip, rewind, pause). It is therefore difficult for a user to determine which media application is playing an audio file given that several media applications may be operating at the same time on the computing device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
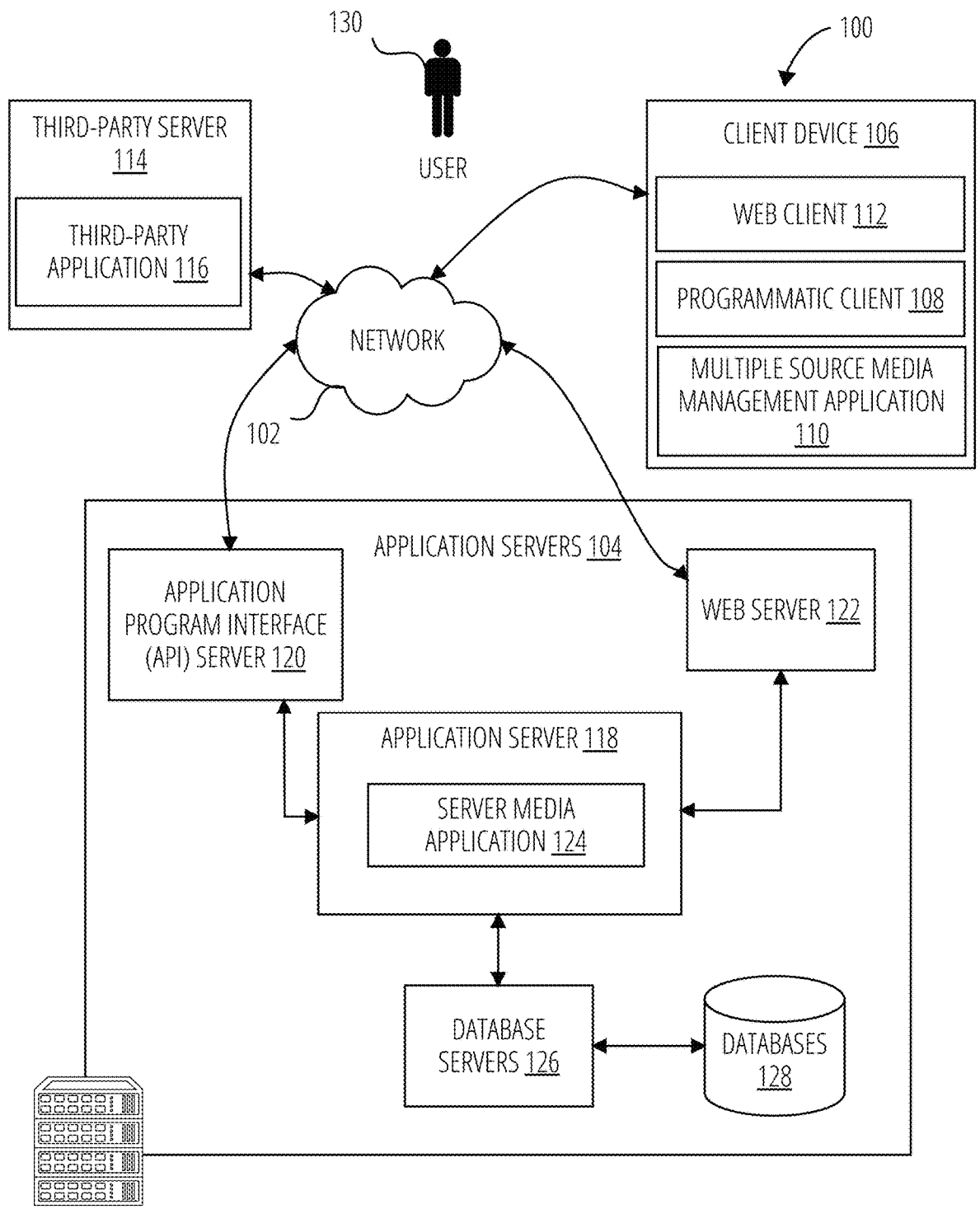
FIG. 1 is a diagrammatic representation of a networked environment in which the present disclosure may be deployed, in accordance with some example embodiments.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Currently, users can play media streams from many different places in an operating system (e.g., Windows) of a computing device. For example, a video can be played in a website in a web browser operating at the computing device. An MP3 file can be played in a default media player (e.g., Windows Media Player) of the computing device. A song can be streamed through a third-party application (e.g., Spotify app) operating on the computing device. Depending on which place a media stream is originating, a user must take different actions to control the stream (e.g. play/pause/mute). For some media applications (e.g., Win32 applications), the user can hover over the media application's entry in the Taskbar to gain access to transport controls. For other media applications (e.g., Microsoft Store Apps), the user can gain access to the System Media Transport Control (SMTC) UI that appears in the top left-hand corner of the screen (but only if the user has media keys on their keyboard). For media streams playing in the web browser, the user has to directly go back to the web browser window, find the media stream, and then take an action on it.

The present application describes a system and method for managing media originating, in a single location, from any media application operating at a computing device. In one example embodiment, the present application describes a method for converging media stream playback from all of the places/apps into a single location. This single location provides the user with a consistent way to manipulate a media stream, regardless of its origin. When the user clicks on the Volume icon in the Taskbar's Notification Area, a flyout will appear that shows the user every media stream that is currently playing. From this flyout, the user can quickly identify what media streams are playing, and then manipulate the playback states of these media streams.

In accordance with example embodiments, a computing device identifies a plurality of media applications configured to operate at the computing device. The computing device accesses metadata and playback information for each media application of the plurality of media applications. The computing device generates a unified graphical user interface for the plurality of media applications. The unified graphical user interface provides media information and control access for each corresponding media application.

As a result, one or more of the methodologies described herein facilitate solving the technical problem of identifying and controlling which media applications that are operating in a computing device. As such, one or more of the methodologies described herein may obviate a need for certain efforts or computing resources that otherwise would be involved in opening a web browser, or searching for other applications that may be responsible for playing a media file at the computing device, resources used by one or more machines, databases, or devices (e.g., within the environment). Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. The client device 106 includes a web client 112 (e.g., a browser), a programmatic client 108 (e.g., a media player "app") that is hosted and execute on the client device 106, and a multiple source media management application 110 that manages media applications (e.g., web client 112, programmatic client 108) operating at the client device 106 and provides a consolidated or unified graphical user interface for the media applications. The programmatic client 108 may be a media player configured to play local media files stored at the client device 106 or stream media files from the server media application 124.

An Application Program Interface (API) server 120 and a web server 122 provide respective programmatic and web interfaces to application servers 104. A specific application server 118 hosts a server media application 124, which includes components, modules and/or applications. The server media application 124 may stream media to the client device 106. For example, the web client 112 communicates with the server media application 124 via the web interface supported by the web server 122. Similarly, the programmatic client 108 communicates with the server media application 124 via the programmatic interface provided by the Application Program Interface (API) server 120. The multiple source media management application 110 is capable of communicating with the server media application 124.

The third-party application 116 may, for example, be another cloud storage system or another media provider. The application server 118 is shown to be communicatively coupled to database servers 126 that facilitates access to an information storage repository or databases 128. In an example embodiment, the databases 128 includes storage devices that store information to be published and/or processed by the server media application 124.

Additionally, a third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party.

Figure 2:
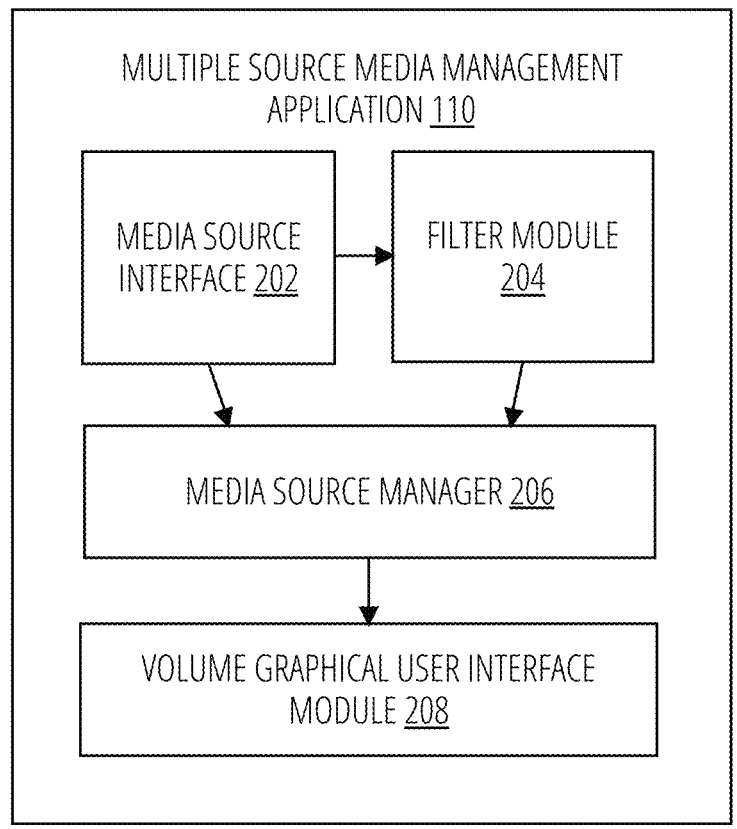
FIG. 2 is a block diagram illustrating a multiple source media management application in accordance with one example embodiment.

FIG. 2 is a block diagram illustrating a multiple source media management application 110 in accordance with one example embodiment. The multiple source media management application 110 comprises a media source interface 202, a filter module 204, a media source manager 206, and a volume graphical user interface module 208.

The media source interface 202 accesses metadata and playback information from media applications (e.g., web client 112, programmatic client 108) operating at the client device 106. Examples of metadata and playback information include:

Media information like artist/title/album art/etc.
Current playback state (e.g. playing, paused, stopped, etc.)
Whether a media item is part of a playlist (meaning "Next" and/or "Previous" buttons would be applicable).
Audio level information (the visual bars you see in Volume Mixer)
Volume level controls (the sliders you see in Volume Mixer)

In one example embodiment, the media source interface 202 communicates with the media applications via APIs. Each media application may interface with an operating system of the client device 106 via a corresponding API. For example, there are two existing APIs that Win32 applications and Microsoft Store Apps have the ability to consume:

Win32 applications can use the ITaskbarList3::ThumbBarAddButtons( ) API to add transport controls to the thumbnail of their application's button on the Taskbar.
Microsoft Store Apps can use the SystemMediaTransportControls API to add metadata and playback controls to the System Media Transport Controls (SMTC) control that appears in the top-left corner of the screen when a user invokes a media key on their keyboard.

The media source interface 202 takes registrations with either of these APIs and integrates the registration info (metadata and playback controls) into a new Graphical User Interface that would operate with the Volume flyout (e.g., the flyout that appears when clicking the Volume icon in the Notification Area of the Taskbar). The SystemMediaTransportControls API registrations is straightforward because each registration automatically represents a stream of media.

However, the registration is more complicated for ITaskbarList3::ThumbBarAddButtons( ) registrations, because a registration may or not represent the addition of buttons that will manipulate a media stream. Buttons registered with this API can display any arbitrary icon and result in any arbitrary action taking place. It is entirely up to the media application to decide which icon to display and what will happen when a button gets pressed. To know when buttons are being added to manipulate a media stream, the ITaskbarList interface can be updated to give developers a way to state that their buttons are associated with a media stream. However, to allow existing media applications to automatically work with this new feature, the filter module 204 implements a "guessing" function that analyzes a registration and then makes a determination as to whether it is associated with a media stream. For example:

If three buttons are being registered and their display strings are "Previous", "Pause", and "Next", then these buttons likely belong to a media stream.
The "guessing" function of the filter module 204 could also make use of other system information when making a determination.
In one example, if the media application's title bar text takes the form of "<string1>-<string2>". This might represent the artist and title of a media stream.
In another example, the IAudioSessionManager API can be used to obtain a list of media applications that are currently playing audio. If the registering application is playing audio, then the buttons being registered likely control that audio.

In another example embodiment, the media source manager 206 accesses metadata from a web browser (e.g., Edge browser) playing media at the client device 106. When a web page (accessed by the web browser at the client device 106) makes use of the HTML5 media control, the control itself sends metadata and playback information to the Shell (of the client device 106) to be displayed in a single unified Graphical User Interface (GUI) such as a Volume flyout). When the user invokes the play/pause/stop/forward/back/etc. buttons on the control, the Volume flyout would be notified and the new playback state would be reflected there. Using YouTube as an example, when the user navigates to a video on youtube.com, YouTube would begin rendering the video using an HTML5 media playback control. Without any action being required on their part, the video's title/description and playback controls would then show up in the Volume flyout.

Therefore, the media source manager 206 consolidates and registers the media information and control access in a single unified GUI. The volume graphical user interface module 208 accesses the single unified graphical user interface to control a volume (or other media functions such as skip, rewind, pause) of the media being played at the client device 106. By converging all media sources into a single location (i.e. the Volume Flyout), this would create a new media surface in Windows.

Figure 3:
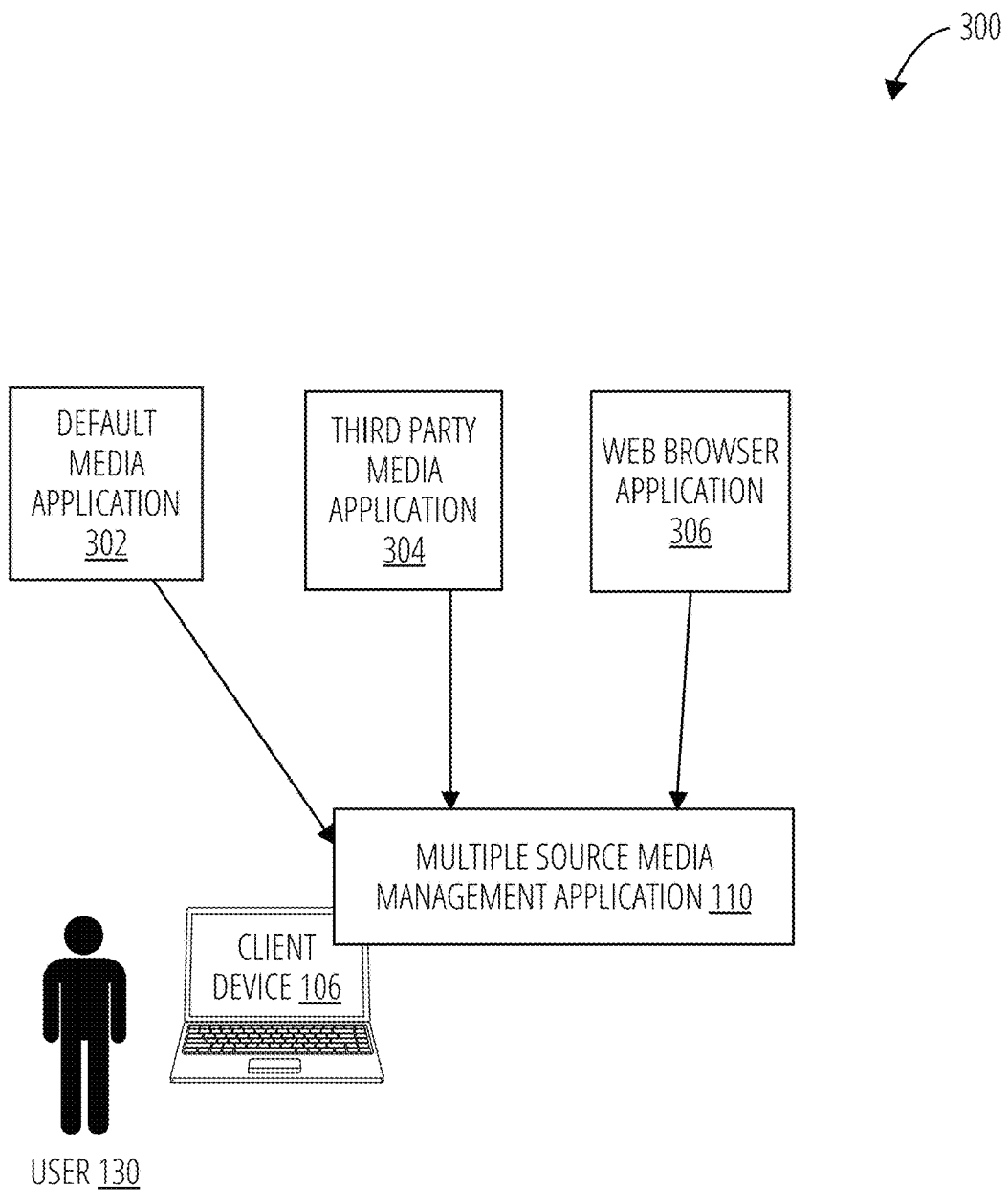
FIG. 3 is a block diagram illustrating an example of an operation of the multiple source media management application in accordance with one example embodiment.

FIG. 3 is a block diagram illustrating an example of an operation of the multiple source media management application in accordance with one example embodiment. The user 130 operates the client device 106 to play media (e.g., music) from a variety of media sources: default media application 302, third party media application 304, and web browser application 306. The multiple source media management application 110 accesses metadata and playback information from each of the media applications (e.g., default media application 302, third party media application 304, web browser application 306) via a corresponding API.

Figure 4:
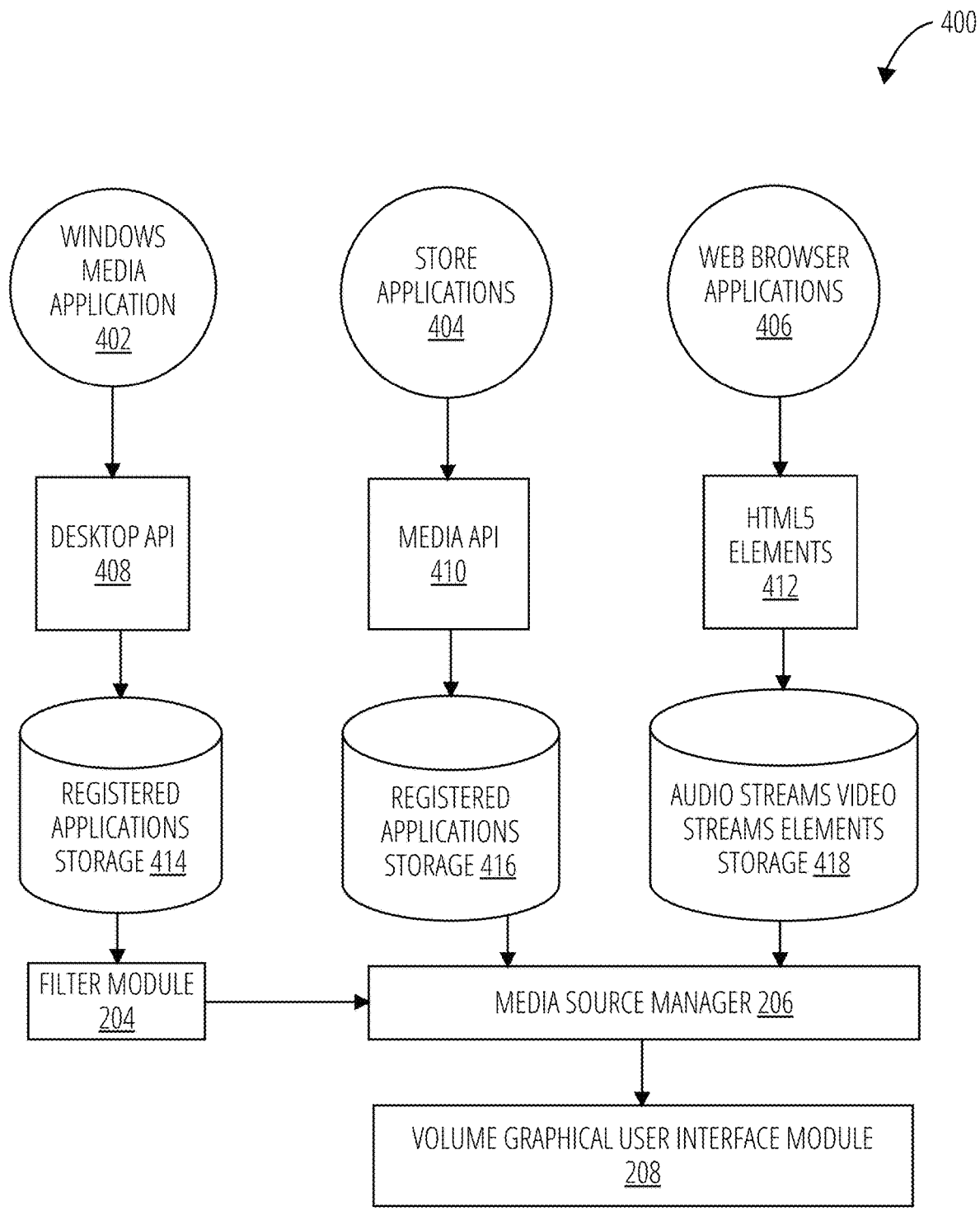
FIG. 4 illustrates an architecture of the multiple source media management application in accordance with one example embodiment.

FIG. 4 illustrates an architecture of the multiple source media management application in accordance with one example embodiment. The architecture 400 comprises a filter module 204, a media source manager 206, a volume graphical user interface module 208, a Windows media application 402, a store applications 404, a web browser applications 406, a desktop api 408, a media api 410, an html5 elements 412, a registered applications storage 414, a registered applications storage 416, and an audio streams video streams elements storage 418.

The windows media application 402 registers with the operating system (not shown) of the client device 106 via an API. For example, the windows media application 402 registers with the operating system using ITaskbarList3API (Desktop applications make use of ITaskbarList3::ThumbBarAddButtons( ) to add buttons to their Taskbar thumbnail). The registered windows media application 402 is stored in the registered applications storage 414 in the client device 106.

The store applications 404 registers with the operating system (not shown) of the client device 106 via an API. For example, the store applications 404 registers with the operating system using SystemMediaTransportControls API (UWP Apps make use of the SMTC API to register information about their media streams with the OS). The registered store applications 404 are stored in the registered applications storage 416 in the client device 106.

The web browser applications 406 registers with the operating system (not shown) of the client device 106 via HTML5 elements. For example, the web browser applications 406 provides HTML5 audio/video elements (websites can play media using the HTML5<audio/> and <video/> elements). The audio streams/video streams are stored in the audio streams video streams elements storage 418.

The filter module 204 performs a guessing function on the registered applications storage 414 to determine metadata and control access, as previously described above with respect to FIG. 2.

The media source manager 206 accesses the metadata and control access from the registered applications storage 414, registered applications storage 416, and audio streams video streams elements storage 418. The volume graphical user interface module 208 generates a single unified GUI based on the metadata and control access. The single unified GUI provides media information and control being performed at Shell level, as opposed to operating on a per-app basis. The volume graphical user interface module 208 enables media information and playback controls for all media streams, regardless or origin, to be displayed in the same place in the Shell. Furthermore, the media source manager 206 enables automatic integration into the Shell of metadata and transport controls of media streams in any Edge browser window making use of the HTML5 media playback control. The media source manager 206 also enables automatic integration into the Shell of metadata and playback manipulation of media streams in any application (Win32) or App (Store) that integrates with the ITaskbarList or SystemMediaTransportControls API.

Figure 5:
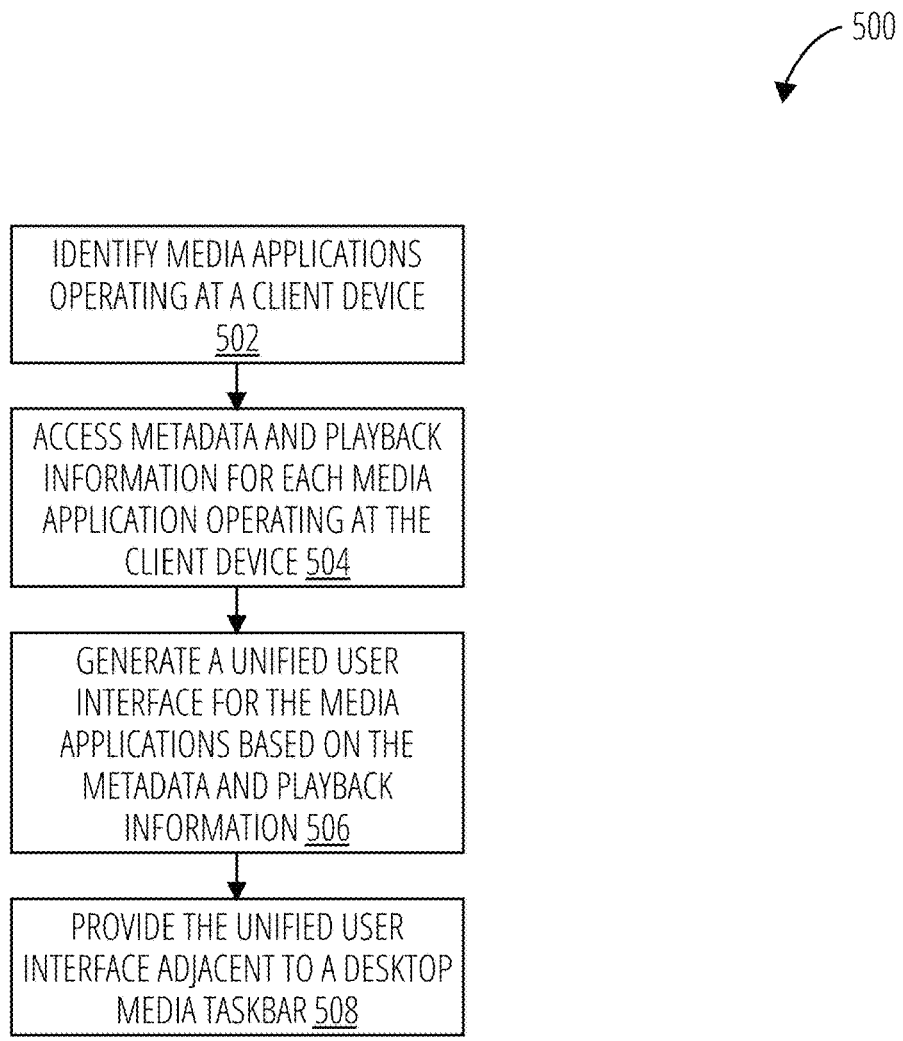
FIG. 5 is a flow diagram illustrating a method for providing a unified media user interface for media applications in accordance with one example embodiment.

FIG. 5 is a flow diagram illustrating a method 500 for generating a customized message in accordance with one example embodiment. Operations in the method 500 may be performed by the multiple source media management application 110, using components (e.g., modules, engines) described above with respect to FIG. 2. Accordingly, the method 500 is described by way of example with reference to the multiple source media management application 110. However, it shall be appreciated that at least some of the operations of the method 500 may be deployed on various other hardware configurations or be performed by similar components residing elsewhere. For example, some of the operations may be performed at the server media application 124.

In block 502, the multiple source media management application 110 identifies media application currently operating (or configured to operate) at the client device 106. In block 504, the multiple source media management application 110 accesses metadata and playback information for each media application operating at the client device 106. At block 506, the multiple source media management application 110 generates a unified user interface for the media applications based on the metadata and playback information. At block 508, the multiple source media management application 110 provides the unified user interface to be placed adjacent to a desktop media taskbar (e.g., volume button of the taskbar).

Figure 6:
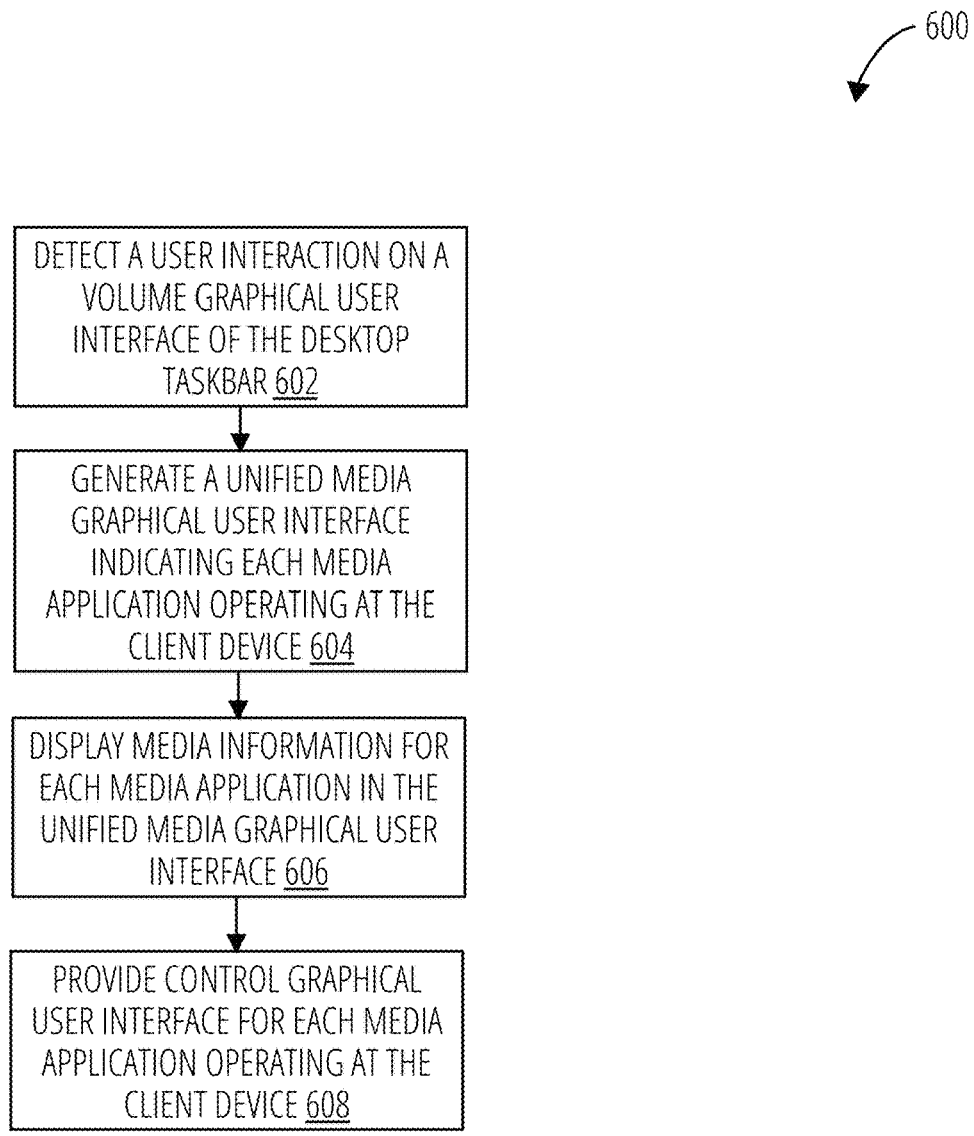
FIG. 6 is a flow diagram illustrating a method for providing control graphical user interface for media applications in accordance with one example embodiment.

FIG. 6 is a flow diagram illustrating a method for providing control graphical user interface for media applications in accordance with one example embodiment. Operations in the method 600 may be performed by the multiple source media management application 110, using components (e.g., modules, engines) described above with respect to FIG. 2. Accordingly, the method 600 is described by way of example with reference to the multiple source media management application 110. However, it shall be appreciated that at least some of the operations of the method 600 may be deployed on various other hardware configurations or be performed by similar components residing elsewhere. For example, some of the operations may be performed at the server media application 124.

At block 602, the multiple source media management application 110 detects a user interaction (e.g., pointer hovering on the volume GUI) on the volume GUI of the desktop taskbar. At block 604, the multiple source media management application 110 generates a unified media GUI indicating each media application being currently operated (e.g., run) at the client device 106. At block 606, the multiple source media management application 110 displays media information for each media application in the unified media GUI. At block 608, the multiple source media management application 110 provides control GUI for each media application operating at the client device 106.

Figure 7:
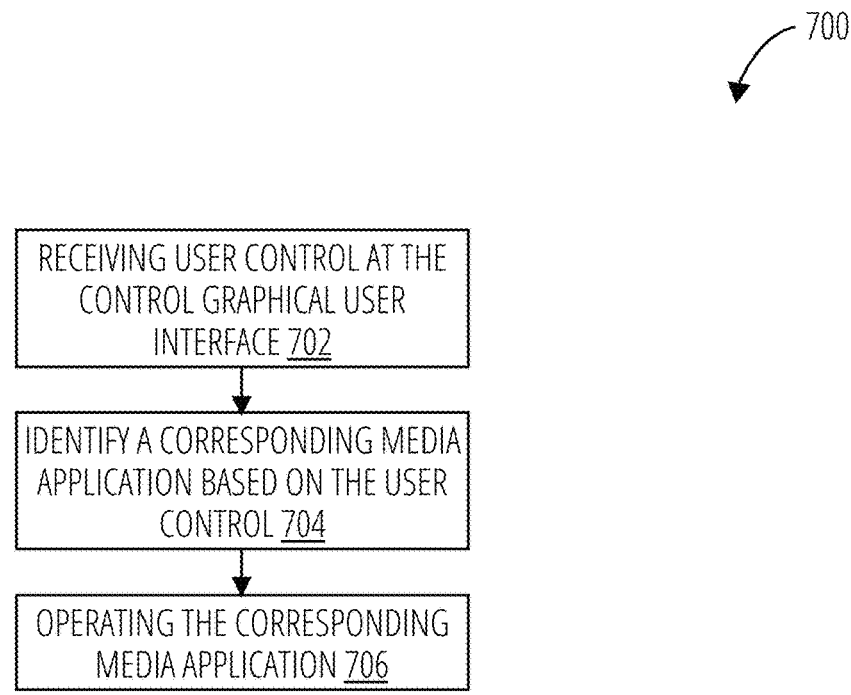
FIG. 7 is a flow diagram illustrating a method for operating a media application with a unified media user interface in accordance with one example embodiment.

FIG. 7 is a flow diagram illustrating a method for operating a media application with a unified media user interface in accordance with one example embodiment. Operations in the method 700 may be performed by the multiple source media management application 110, using components (e.g., modules, engines) described above with respect to FIG. 2. Accordingly, the method 700 is described by way of example with reference to the multiple source media management application 110. However, it shall be appreciated that at least some of the operations of the method 700 may be deployed on various other hardware configurations or be performed by similar components residing elsewhere. For example, some of the operations may be performed at the server media application 124.

At block 702, the multiple source media management application 110 receives a user control (e.g., user clicking on a skip button) at the control GUI. At block 704, the multiple source media management application 110 identifies a corresponding media application on the user control (e.g., skip button for the web browser). At block 706, the multiple source media management application 110 operates the function or operation with the corresponding media application (e.g., skip the song played with the web browser).

Figure 8:
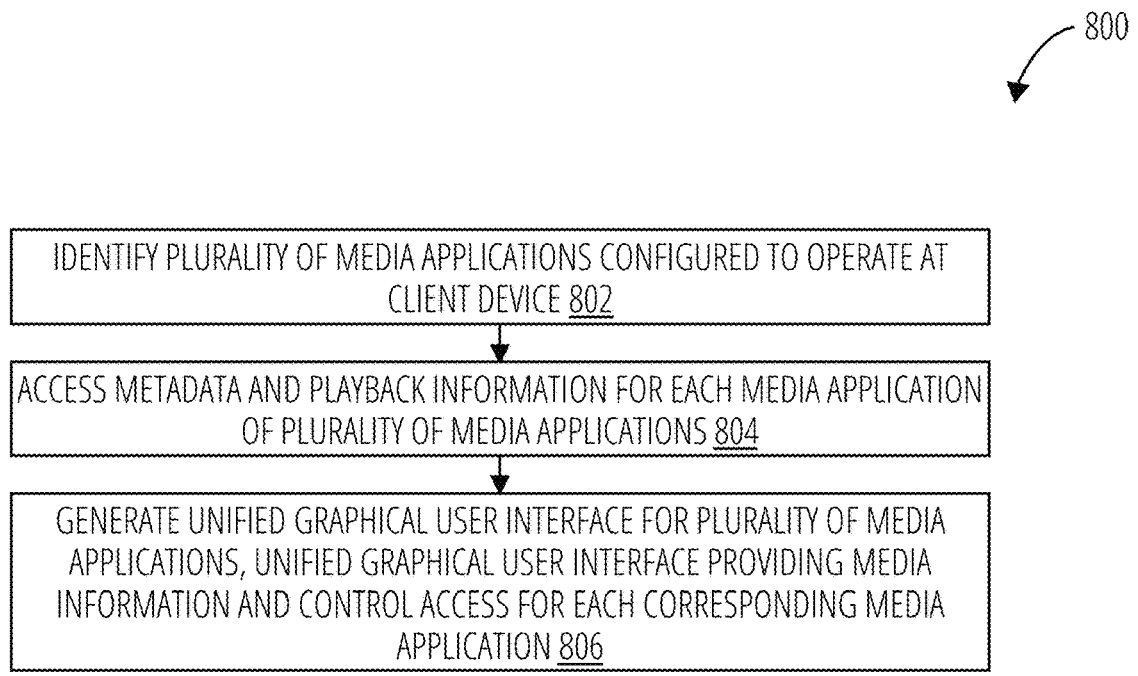
FIG. 8 illustrates a routine in accordance with one embodiment.

FIG. 8 illustrates a routine in accordance with one embodiment. In block 802, routine 800 identifies a plurality of media applications configured to operate at a client device. In block 804, routine 800 accesses metadata and playback information for each media application of the plurality of media applications. In block 806, routine 800 generates a unified graphical user interface for the plurality of media applications, the unified graphical user interface providing media information and control access for each corresponding media application.

Figure 9:
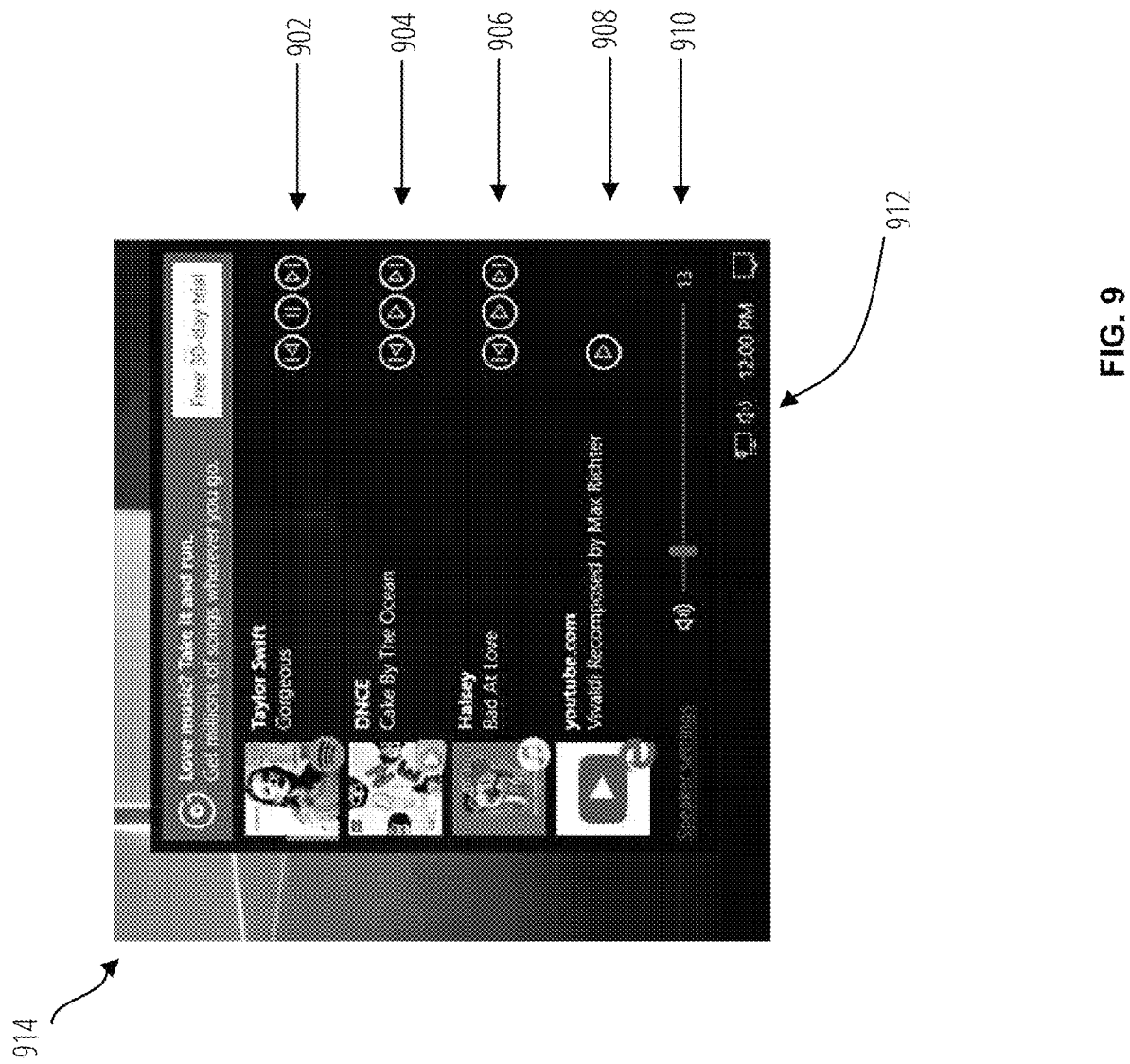
FIG. 9 illustrates an example of a unified media user interface in accordance with one example embodiment.

FIG. 9 illustrates an example of a unified media user interface in accordance with one example embodiment. The unified media user interface 914 includes metadata corresponding to each media application operating at the client device 106. For example, the unified media user interface 914 illustrates song information and corresponding control being operated by media application 902, media application 904, media application 906, and media application 908. The volume graphical user interface module 208 generates a single volume control button that control a volume for all the media applications. The unified media user interface 914 is placed adjacent to the taskbar 912.

Figure 10:
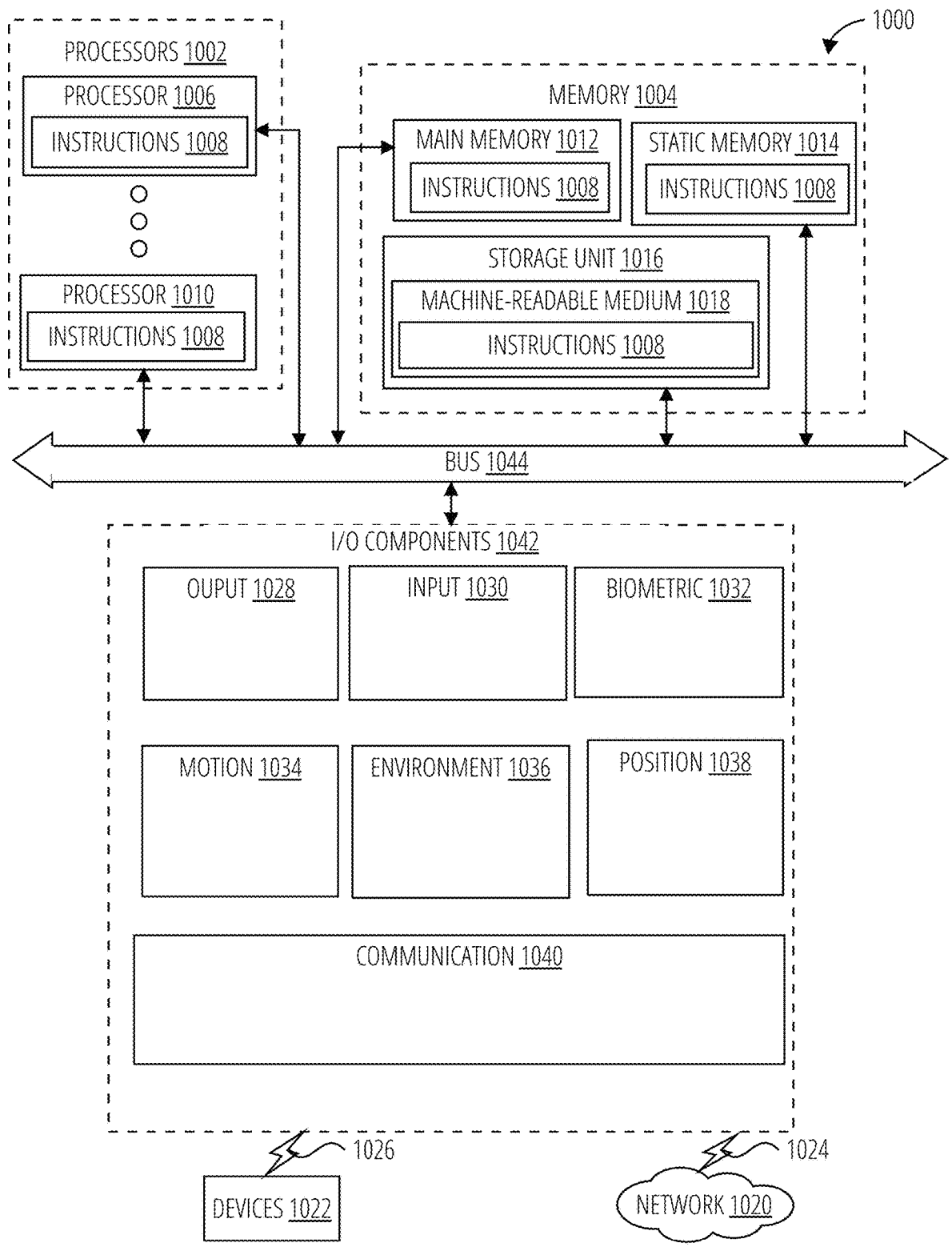
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

EXAMPLES

Example 1 is a computer-implemented method comprising: identifying a plurality of media applications configured to operate at a computing device; accessing metadata and playback information for each media application of the plurality of media applications; and generating a unified graphical user interface for the plurality of media applications, the unified graphical user interface providing media information and control access for each corresponding media application.

In example 2, the subject matter of example 1, further comprises: placing the unified graphical user interface adjacent to a volume graphical user interface of a taskbar in a desktop of the computing device.

In example 3, the subject matter of example 2, further comprises: detecting a user interaction with the volume graphical user interface; and causing a display of the unified graphical user interface in response to the detecting.

In example 4, the subject matter of example 3, further comprises: detecting a user interaction with a control corresponding to one of the plurality of media applications on the unified graphical interface; and performing a function corresponding to the control with the corresponding media application.

In example 5, the subject matter of example 1, wherein the media information comprises media metadata, playback state, and audio level information.

In example 6, the subject matter of example 1, wherein the control access comprises volume level control, and media playback control.

In example 7, the subject matter of example 1, wherein one of the plurality of media applications includes one of an operating system default media application, a third-party application, and a web browser application.

In example 8, the subject matter of example 1, wherein the accessing metadata and playback information further comprises: registering one of the plurality of media applications with a media API of an operating system operating at the computing device to access metadata and playback control for the registered media application; and integrating the metadata and playback control with the unified graphical user interface, the media information being based on the metadata, the control access being based on the playback control.

In example 9, the subject matter of example 8, further comprises: analyzing the registration with a filter that is configured to determine whether an icon originating from the registered media application is associated with the metadata or the playback control.

In example 10, the subject matter of example 10, further comprises: wherein one of the media applications includes a web browser, wherein accessing metadata and playback information further comprises: detecting that the web browser is operating HTML5 media control; and accessing metadata and playback information from the web browser.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
    identifying a plurality of media applications configured to operate at a computing device;
    accessing metadata and playback information for each media application of the plurality of media applications;
    generating a unified graphical user interface for the plurality of media applications, the unified graphical user interface providing media information and control access for each corresponding media application; and
    displaying playback control items for all media applications of the plurality of media applications in the unified graphical user interface,
    wherein the accessing metadata and playback information further comprises:
    accessing one of the plurality of media applications registered with a media API of an operating system operating at the computing device to access metadata and playback control for the registered media application;
    integrating the metadata and playback control with the unified graphical user interface, the media information being based on the metadata, the control access being based on the playback control; and
    analyzing the registration with a filter that is configured to determine whether an icon originating from the registered media application is associated with the metadata or the playback control.

2. The computer-implemented method of claim 1, further comprising:
    placing the unified graphical user interface adjacent to a volume graphical user interface of a taskbar in a desktop of the computing device.

3. The computer-implemented method of claim 2, further comprising:
    detecting a user interaction with the volume graphical user interface; and
    causing a display of the unified graphical user interface in response to the detecting.

4. The computer-implemented method of claim 3, further comprising:
    detecting a user interaction with a control corresponding to one of the plurality of media applications on the unified graphical interface; and
    performing a function corresponding to the control with the corresponding media application.

5. The computer-implemented method of claim 1, wherein the metadata and the playback information comprise media information, playback state, and audio level information.

6. The computer-implemented method of claim 1, wherein the control access comprises volume level control, and media playback control.

7. The computer-implemented method of claim 1, wherein one of the plurality of media applications includes one of an operating system default media application, a third-party application, and a web browser application.

8. The computer-implemented method of claim 1, wherein one of the media applications includes a web browser, wherein accessing metadata and playback information further comprises:
    detecting that the web browser is operating HTML5 media control; and
    accessing metadata and playback information from the web browser.

9. A computing apparatus, the computing apparatus comprising:
    a processor; and
    a memory storing instructions that, when executed by the processor, configure the apparatus to:
    identify a plurality of media applications configured to operate at the computing apparatus;
    access metadata and playback information for each media application of the plurality of media applications;
    generate a unified graphical user interface for the plurality of media applications, the unified graphical user interface providing media information and control access for each corresponding media application; and
    display playback control items for all media applications of the plurality of media applications in the unified graphical user interface,
    wherein the access metadata and playback information further comprises:
    accessing one of the plurality of media applications registered with a media API of an operating system operating at the computing apparatus to access metadata and playback control for the registered media application;
    integrate the metadata and playback control with the unified graphical user interface, the media information being based on the metadata, the control access being based on the playback control; and
    analyze the registration with a filter that is configured to determine whether an icon originating from the registered media application is associated with the metadata or the playback control.

10. The computing apparatus of claim 9, wherein the instructions further configure the apparatus to:
    place the unified graphical user interface adjacent to a volume graphical user interface of a taskbar in a desktop of the computing apparatus.

11. The computing apparatus of claim 10, wherein the instructions further configure the apparatus to:
    detect a user interaction with the volume graphical user interface; and
    cause a display of the unified graphical user interface in response to the detecting.

12. The computing apparatus of claim 11, wherein the instructions further configure the apparatus to:
    detect a user interaction with a control corresponding to one of the plurality of media applications on the unified graphical interface; and
    perform a function corresponding to the control with the corresponding media application.

13. The computing apparatus of claim 9, wherein the metadata and the playback information comprise media information, playback state, and audio level information.

14. The computing apparatus of claim 9, wherein the control access comprises volume level control, and media playback control.

15. The computing apparatus of claim 9, wherein one of the plurality of media applications includes one of an operating system default media application, a third-party application, and a web browser application.

16. A non-transitory computer-readable storage medium including instructions that when executed by a computer, cause the computer to:

identify a plurality of media applications configured to operate at the computer;

access metadata and playback information for each media application of the plurality of media applications;

generate a unified graphical user interface for the plurality of media applications, the unified graphical user interface providing media information and control access for each corresponding media application; and display playback control items for all media applications of the plurality of media applications in the unified graphical user interface, wherein the access metadata and playback information further comprises:

accessing one of the plurality of media applications registered with a media API of an operating system operating at the computer to access metadata and playback control for the registered media application;

integrate the metadata and playback control with the unified graphical user interface, the media information being based on the metadata, the control access being based on the playback control; and analyze the registration with a filter that is configured to determine whether an icon originating from the registered media application is associated with the metadata or the playback control.

* * * * *